JOHN McCLOSKEY.
Apparatus for Raising Water, &c.
No. 127,624. Patented June 4, 1872.
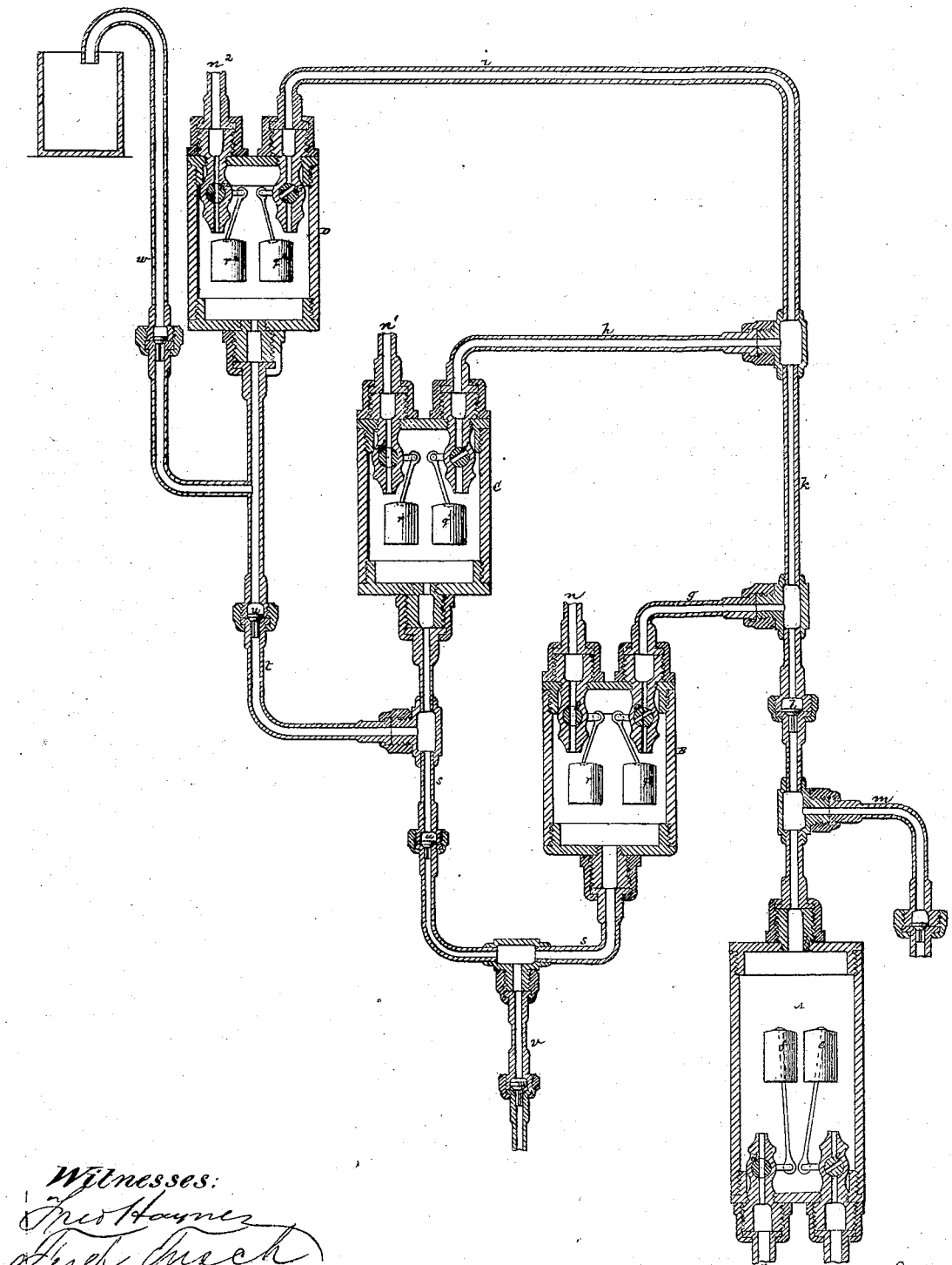
Witnesses:
Geo Haynes
Ferd Finck
John McCloskey 127,624

UNITED STATES PATENT OFFICE.

JOHN McCLOSKEY, OF NEW YORK, N. Y.

IMPROVEMENT IN APPARATUS FOR ELEVATING WATER, &c.

Specification forming part of Letters Patent No. 127,624, dated June 4, 1872.

Specification describing an Improvement in Apparatus for Elevating Water and other Liquids, invented by JOHN McCLOSKEY, of the city, county, and State of New York.

This invention consists in a novel arrangement of the floats and valves in their respective chambers in an apparatus for elevating water, also applicable to raising other liquids, in which a pressure-accumulator or generator, operating by the compression of air derived from an intermittent influx and efflux of water under a head or pressure, is combined with one or more elevated receivers or transfer-chambers, said floats controlling the valves for alternately opening and closing inlets and outlets with which the accumulator and receivers are provided.

The accompanying drawing, which forms part of this specification, represents a sectional elevation of an apparatus constructed in accordance with my invention.

A is a pressure accumulator or generator, made of any suitable height and size, and provided with a lower inlet, $a$, for water under pressure, as from a street-main, and a lower outlet or drain-pipe, $b$. These inlet and outlet pipes are fitted with cocks or valves $c\ d$, controlled by floats $e\ f$ within the accumulator for successively and automatically opening and closing said inlet and outlet, to produce an alternate admission and discharge of water to and from the accumulator for the purpose of keeping up a succession of compressed air charges within the upper portion of the accumulator and in the receiver or receivers connected therewith. B, C, and D are elevated receivers or transfer-chambers, of which there may be any desired number, arranged one above the other, and connected at their tops by branches $g\ h\ i$ and pipe $k$, with the upper portion or compressed air-space of the accumulator A. The pipe $k$ is fitted with a check-valve, $l$, to prevent the return of compressed air from the receivers when the water falls in the accumulator preparatory to generating a renewed pressure, and said pipe further provided with an air-inlet, $m$, fitted with a check-valve for supplying air to the accumulator below the check-valve $l$. The receivers B, C, and D are also furnished at their tops with air-outlets $n\ n^1\ n^2$, and these outlets and the compressed air-supply pipes or branches $g$, $h$, and $i$ are severally fitted with cocks or valves $o\ p\ o^1\ p^1\ o^2\ p^2$, controlled by floats $q\ r\ q^1\ r^1\ q^2\ r^2$ within the receivers for alternately opening and closing the air-outlet and inlet of each receiver. Said receivers B, C, and D are connected with each other, in regular order, at their bottoms by water-pipes $s\ t$, fitted with check-valves $u$. There is also a water-supply pipe, $v$, connected with the pipe $s$, and fitted with a check-valve for conveying water from the main to the receivers or lower one of the series, and the pipe $t$ is represented as connecting with a discharge-pipe, $w$, for finally delivering the water raised by the apparatus into a tank, $x$, or otherwise.

The operation is as follows: Supposing water to be entering from the main up the inlet $a$, the cock $c$ being open and cock $d$ closed, the floats $e\ f$ will be raised in the accumulator A till the water reaches a sufficient height to close the cock $c$ and open the cock $d$, when water will flow off by the drain-pipe $b$ and in due course, by the lowering of the floats, open the cock $c$ again and close the cock $d$, and so on indefinitely. Each time the water falls in the accumulator A air of ordinary pressure is supplied to the latter by the inlet $m$, and each time the water rises in the accumulator, a compression of such air takes place, and said compressed air is conveyed, by the pipes $k$, $g$, $h$, and $i$ to the receivers B, C, and D, whenever the cocks $o$, $o^1$, and $o^2$ are open to admit of the passage of such air thereto, for the purpose of discharging water primarily received by the supply-pipe $v$, and passing from a lower to a higher receiver by the pipes $s\ t$, and finally discharging the same by the pipe $w$. Thus, water rising in the receiver B, the cock $p$ being open and cock $o$ closed, the floats $q$ and $r$ are, in due course, made to reverse the position of the valves, opening the cock $o$ to admit compressed air from the accumulator, and closing the cock $p$. This causes the water to be forcibly expelled by the compressed air along the pipe $s$ into the receiver C; and, as the water completes its fall in the reservoir B, the cocks $o$ and $p$ are again reversed for a repetition of the action. The water thus forced into the receiver C, the cock $p^1$ being open and cock $o^1$ closed, in due course causes the floats $q^1\ r^1$ to reverse the position of said cocks for the purpose of admitting compressed air by the pipe $h$ to expel the water into the next receiver D. This action is continued indefinitely throughout the whole series of receivers till the water is finally discharged by the pipe $w$ at a much greater altitude than is due to the mere head or pressure of the water in the main, and which altitude may be extended indefinitely by increasing the number of receivers or transfer-chambers.

The outlet $b$ may be used as a supply-pipe for the lower portion of a building, and the tank $x$ as a reservoir for supplying the upper portion thereof.

I do not claim, broadly, the elevation of water by an accumulation of compressed air; but

What I claim, and desire to secure by Letters Patent, is—

In the combination of the elevated receivers B C D (one or more) with the compressed air-accumulator or generator A, the arrangement of the influx and efflux valves and passages for the admission and discharge of air and water, substantially as shown and described.

JOHN McCLOSKEY.

Witnesses:
FRED. HAYNES,
FERD. TUSCH.